United States Patent [19]

Chao

[11] Patent Number: 4,845,159

[45] Date of Patent: Jul. 4, 1989

[54] PHOTOACTIVE AND THERMALLY ACTIVE POLYMERIC IODONIUM SALTS, USE, AND METHOD FOR MAKING

[75] Inventor: Herbert S. Chao, Schenectady, N.Y.

[73] Assignee: General Electric Company, Schenectady, N.Y.

[21] Appl. No.: 103,154

[22] Filed: Oct. 1, 1987

[51] Int. Cl.$^4$ .......................... C08G 8/28; C08G 8/36; C08G 59/40

[52] U.S. Cl. .................................. 525/390; 525/391; 525/396; 525/397; 525/480; 525/481; 525/502; 525/504; 525/506; 525/508

[58] Field of Search ............... 525/390, 391, 396, 397, 525/480, 481, 502, 504, 506, 508

[56] References Cited

U.S. PATENT DOCUMENTS

| | | | |
|---|---|---|---|
| 4,151,175 | 4/1979 | Crivello et al. | 548/522 |
| 4,382,130 | 5/1983 | Ellison et al. | 525/506 |
| 4,404,355 | 9/1983 | Eldin et al. | 525/506 |
| 4,480,059 | 10/1984 | Dudgeon | 525/506 |

OTHER PUBLICATIONS

Yamada and Okawara, Die Macromol. Chemie., 152, 153(1972).

*Primary Examiner*—John Kight
*Assistant Examiner*—Frederick Krass
*Attorney, Agent, or Firm*—William A. Teoli; James C. Davis, Jr.; William H. Pittman

[57] ABSTRACT

Iodonation of novolak resin or polyphenylene ether followed by the metatheses of the resulting iodonated product with a polyhalometal or metalloid salt can provide a photoactive cure catalyst or thermally active cure catalyst for cationically polymerizable organic materials. A copper cocatalyst has been found useful in thermal curing.

5 Claims, No Drawings

PHOTOACTIVE AND THERMALLY ACTIVE POLYMERIC IODONIUM SALTS, USE, AND METHOD FOR MAKING

CROSS-REFERENCE TO RELATED APPLICATIONS

Reference is made to copending application Serial No. (RD-17,421), U.S. Ser. No. 103,153 Walles et al., for MICROENCAPSULATION METHOD, MICROELECTRONIC DEVICES MADE THEREFROM, AND HEAT CURABLE COMPOSITIONS, assigned to the same assignee as the present invention and incorporated herein by reference.

BACKGROUND OF THE INVENTION

The present invention relates to a method for making photoactive polymeric iodonium salts from capped novolak resin. The photoactive polymeric iodonium salts can be combined with a copper compound, as a cocatalyst, to provide thermal curing agents for cationically polymerizable organic materials.

As shown by Crivello et al., U.S. Pat. No. 4,151,175, assigned to the same assignee as the present invention, and incorporated herein by reference, diarylhalonium salts can be made by initially forming a diaryl iodonium bisulfate and thereafter effecting a metathesis reaction with a counterion source.

Polymer bound iodonium salts have been described as shown by Yamada and Okawara, Die Macromol. Chemie., 152, 153 (1972) by effecting reaction between iodinated polystyrene, benzene and sulfuric acid, or polystyrene with phenyl iodoso acetate in sulfuric acid.

The present invention is based on my discovery that if the phenolic hydroxyl group of a novolak resin is capped with an organic radical, such as a methyl or phenyl radical, and the resulting capped novolak resin is iodonated with an aryliodoso organic sulfonic acid, a polydiaryl iodonium organic sulfonic acid is formed such as a poly(diaryliodoniumtosylate). This polymeric iodonium salt can be metathesized with a polyhalometalloid alkali metal, or alkaline earth metal salt, such as sodium hexafluoroantimonate, to produce a photoactive polymeric iodonium salt. The photoactive polymeric iodonium salt can be combined with an effective amount of a copper compound as defined hereinafter, to provide a cocatalyst, useful for the thermal curing of cationically polymerizable organic materials.

STATEMENT OF THE INVENTION

There is provided by the present invention polymeric iodonium salts comprising chemically combined units of the formula,

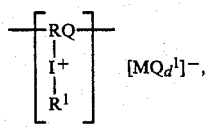
(1)

where R is selected from the class consisting of $C_{(6-14)}$ divalent arylene radicals and $C_{(6-14)}$ divalent arylene radicals substituted with from 1 to 3 radicals inert during thermal or photoactivation, $R^1$ is a monovalent $C_{(6-14)}$ aryl radical or a $C_{(6-14)}$ monovalent aryl radical substituted with from 1 to 5 radicals inert during thermal or photoactivation, M is a metal or metalloid, Q is selected from methylene or oxygen, and when Q is methylene, R is substituted with at least one $-OR^2$ radical, where $R^2$ is hydrogen, or a $C_{(1-14)}$ monovalent hydrocarbon radical or a $C_{(1-14)}$ monovalent hydrocarbon substituted with one or more radicals neutral during photo or thermal activation, $Q^1$ is a halogen radical, and d is an integer having a value of 4-6 inclusive.

Radicals included within R of formula 1, are, for example, phenylene, xylylene, tolylene, naphthylene, anthralene; substituted arylene radicals such as chlorophenylene, bromotolylene, methoxyphenylene, ethoxyphenylene, methoxytolylene, bromonaphthylene, phenoxyphenylene; radicals included by $R^1$ of formula 1 are, for example, phenyl, tolyl, xylyl, naphthyl, halophenyl, halotolyl, nitroxylyl; radicals included by $R^2$ are, for example, hydrogen, methyl, ethyl, propyl, butyl, pentyl, hexyl, heptyl, phenyl, xylyl, tolyl. There are included within M of formula 1, antimony, arsenic, boron and phosphorous. Halogen radicals included by $Q^1$ are, for example, fluoro, bromo, iodo, chloro.

Some of the polymeric iodonium salts which can be used in the practice of the present invention consist of chemically combined units of the formulas,

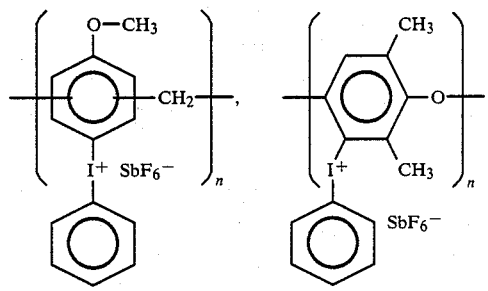

In the practice of the preferred form of the present invention, a phenol-formaldehyde novolak resin, such as an orthocresol novolak, is initially capped with an organo radical such as a methyl radical using methyliodide, an organic solvent, and an acid scavenger, for example potassium carbonate. The capped novolak then can be further reacted with an iodoso organic sulfonic acid for example, phenyliodosotosylate to produce the corresponding poly(diaryliodoniumtosylate). The poly(diaryliodoniumtosylate) can then be metathesized with an alkali metal polyhalo metalloid salt in an inert organic solvent to produce the corresponding poly(diaryliodonium)polyhalo metalloid salt consisting of chemically combined units of formula 1.

Copper compounds which can be utilized as a cocatalyst combination with polymeric iodonium salts of formula 1 are, for example, copper naphthenate, copper benzoate, copper salicylate, copper acetoacetonate, copper stearate.

Various cationically polymerizable organic materials can be used in combination with the polymeric iodonium salt and copper cocatalyst to make heat curable compositions. The cationically polymerizable organic material can be polymerized utilizing an effective amount of the polymeric iodonium salt having units of formula 1 in combination with the copper cocatalyst. An effective amount of polymeric iodonium salt are, for example, a poly(diaryliodoniumhexafluoro antimonate salt) of formula 1, in an amount which is sufficient to provide from 0.1 to 10% by weight of iodine based on the weight of the heat curable composition. In addition, the copper cocatalyst can be utilized in an amount sufficient to provide from 0.01% to up to about equal parts by weight of copper, based on the weight of poly(diaryliodonium) polyhalometalloid salt.

Some of the cationically polymerizable organic materials which can be used in the practice of the present invention to make heat curable compositions are, for example, epoxy resins, thermosetting organic condensation resins, vinyl organic prepolymers, cyclic ethers, cyclic amines, lactones, etc.

The heat curable compositions can be combined with inactive ingredients such as silica, clays, talc, glass fibers, extenders, hydrated alumina, carbon fibers, process aids in amounts of up to 500 parts of filler, per 100 parts of cationically polymerizable organic material.

In order that those skilled in the art will be better able to practice the invention, the following examples are given by way of illustration and not by way of limitation. All parts are by weight.

EXAMPLE

A mixture of 4 grams of o-cresol novolak (HT9490 of Ciba Geigy Company), 14.2 grams, 0.1 mole of methyliodide, 13.82 grams, 0.1 mole of finely ground potassium carbonate and 100 ml of acetone was refluxed with stirring for about 12 hours. After cooling the reaction mixture, it was filtered and the filtrate was concentrated in vacuo. Their residue was diluted with chloroform and then washed with water to remove the salt completely. An organic layer was separated, dried with magnesium sulfate and concentrated in vacuo to provide 4.0 grams of product. Based on method of preparation, the product was a methyl-capped orthocresol novolak. The material was found to be free of phenolic hydroxyl groups based on FT-IR spectra.

A mixture of 4.0 grams of the above methyl-capped orthocresol novolak, 50 ml of acetic acid, and 7.84 grams (0.02 mole) of phenyl iodosotosylate was stirred for 90 minutes at room temperature. A slightly exothermic reaction occurred upon mixing. After stirring for 90 minutes at room temperature, the reaction mixture was poured into 100 ml of water and then extracted with methylene chloride. The organic layer was separated and dried over magnesium sulfate and concentrated in vacuo. Based on method of preparation, there was obtained a poly(diaryliodonium tosylate).

The above poly(diaryliodoniumtosylate) was dissolved in 30 ml of methylethylketone. There was added 5 grams, 0.019 mole of sodium hexafluoroantimonate, and the mixture was stirred at room temperature for one hour. The reaction mixture was then filtered through celite and the filtrate was concentrate in vacuo. The residue was diluted with methylene chloride and the solution was filtered again and then concentrated in vacuo. There was obtained 5.6 grams of a polydiphenyliodoniumhexafluoroantimonate consisting essentially of chemically combined units of the formula

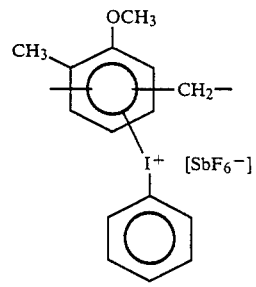

Elemental analysis of the polymer showed a 22.4% by weight of iodine and 1.44% by weight of antimony based on the weight of polymer.

A 5% by weight solution of the above polydiphenyliodoniumhexafluoroantimonate in 3',4'-epoxycyclohexylmethyl-3,4-epoxycyclohexane carboxylate in the presence of 0.5% by weight of cupric benzoate was cured in 65 seconds at 100° C. as shown by a tack-free film.

A 1% mixture of the polydiphenyliodoniumhexafluoroantimonate and vinylcyclohexenedioxide was applied as a film onto a glass plate. The film was irradiated using a GE A3T7 medium pressure mercury arc lamp, positioned at a distance of 6" from the sample. Tack-free film was obtained after 13 seconds' irradiation.

Although the above example is directed to only a few of the very many variables which can be used in the practice of the present invention, it should be understood that the present invention is directed to a much broader variety of polydiaryliodoniumpolyhalometalloid salts comprising chemically combined units of formula 1, as well as the curable compositions and photocurable compositions which can be obtained in the practice of the present invention as shown in the description preceding this example.

What is claimed and sought to be protected by Letters Patent of the United States is as follows:

1. A heat curable composition comprising
   (A) cationically polymerizable dipolar organic material,
   (B) an effective amount of a polymerized iodonium salt having chemically combined groups of the formula, $[MQ^1{}_d]^-$ resulting from the metathesis of an iodonated phenol-formaldehyde resin with an alkali metal polyhalo metal salt, where the phenol-formaldehyde resin is initially capped with an organo radical prior to iodonation, and
   (C) an effective amount of a copper cocatalyst, where M is a metal or metalloid, $Q^1$ is a halogen radical, and d is an integer having a value of 4–6.

2. A photocurable composition comprising
   (A) cationically polymerizable organic material,
   (B) an effective amount of a polymeric iodonium salt having chemically combined groups of the formula $[MQ^1{}_d]^-$ resulting from the metathesis of an iodonated phenol-formaldehyde resin with an alkali metal polyhalo metal salt, where the phenol-formaldehyde resin is initially capped with an organo radical prior to iodonation, M is a metal or metalloid, $Q^1$ is a halogen radical and d is an integer having a value of 4–6.

3. A heat curable composition in accordance with claim 1, where M is antimony.

4. A heat curable composition in accordance with claim 1 where the copper cocatalyst is copper acetylacetonate.

5. A photocurable composition in accordance with claim 2, where the cationically polymerizable organic material is an epoxy resin.

* * * * *